United States Patent Office 3,190,884
Patented June 22, 1965

3,190,884
NEW ERGOLENE AND ERGOLINE DERIVATIVES
Albert Hofmann and Franz Troxler, Bottmingen, Basel-Land, Switzerland, assignors to Sandoz Ltd. (also known as Sandoz A.G.), Basel, Switzerland
No Drawing. Filed Nov. 5, 1962, Ser. No. 235,559
Claims priority, application Switzerland, Nov. 10, 1961, 13,071; Sept. 21, 1962, 11,100
5 Claims. (Cl. 260—285.5)

The present invention relates to new ergolene and ergoline derivatives, their acid addition salts, and pharmaceutical compositions containing as an essential active ingredient a said new ergolene or ergoline derivative or a non-toxic pharmaceutically acceptable acid addition salt in an inert carrier or vehicle prepared in unit dosage form.

The present invention provides compounds of the formula:

(I)

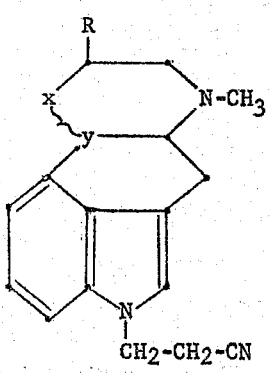

in which R is an alkoxycarbonyl, dialkylcarbamoyl, hydroxyalkylcarbamoyl, dialkylureido or alkoxycarbonylamino radical, whereof the alkyl portion in each radical contains from one to four carbon atoms inclusive, a hydroxymethyl radical or a carbonyl radical substituted with the tripeptide radical of a natural ergot alkaloid of the peptide type, and $\overset{\frown}{x\ y}$ signifies the radical

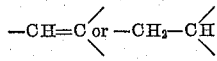

their acid addition salts, and pharmaceutical compositions containing, in addition to an inert carrier or vehicle, a compound I and/or an acid addition salt thereof.

The compounds I and their acid addition salts are produced by reacting a compound of the formula:

(II)

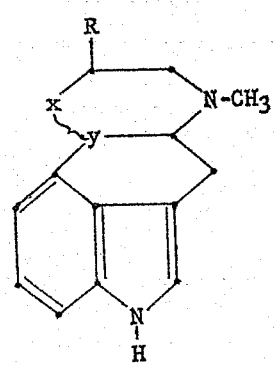

in which R and $\overset{\frown}{x\ y}$ have the above significance, with acrylonitrile in the presence of a proton acceptor and, when an acid addition salt is required, salt formation is effected with an organic or inorganic acid in a manner per se known.

Suitable acids for salt formation are, for example hydrochloric, hydrobromic, hydriodic, sulfuric, citric, tartaric, succinic, maleic, malic, acetic, oxalic, benzoic, fumaric, gallic, hexahydrobenzoic, methanesulfonic and phosphoric acids.

The possibilities of obtaining variations of the lysergic acid molecule and its derivatives, the most important of which are the natural ergot alkaloids and their 9,10-dihydro compounds, by chemical substitution, are very limited. Chemical conversions are difficult because of the tendency of the lysergic acid molecule to decompose due to its susceptibility towards acids, bases and oxidation agents and even to the oxygen of the air and light and because of the ease with which isomers are formed. It was thus surprising to find that a cyanoethyl radical could readily be introduced into the 1-position of the lysergic acid molecule.

The production of compounds I may, for example, be effected by dissolving a compound II in a suitable solvent such as dioxane and reacting it with acrylonitrile in the presence of a proton acceptor, e.g., sodium methylate, sodium ethylate or benzyl trimethylammonium hydroxide, at room temperature or higher. Alcohols have been found to be unsuitable as solvents as they themselves react with acrylonitrile to some extent. Acrylonitrile itself may also be used as the solvent and while the starting materials sometimes do not initially readily dissolve therein they generally go into solution satisfactorily during the course of the reaction.

For the purpose of isolation, the reaction mixture is preferably taken up and shaken in a binary solvent mixture, e.g., ether/aqueous tartaric acid. The desired compound I is obtained from the acidic aqueous layer, isolation and purification being effected in accordance with known methods, e.g., by chromatography on aluminum oxide and/or recrystallization.

When acrylonitrile is used as the solvent and a solid alkali metal alcoholate as the proton acceptor, the latter may simply be filtered off, the acrylonitrile evaporated and its polymerization products separated by taking up the residue in chloroform and chromatographing the chloroform solution of the crude product.

The compounds I are solid at room temperature. They give positive Van Urk's and Keller's color reactions in shades which differ from the corresponding reactions of the starting materials.

The compounds I are useful as intermediates in the production of pharmaceuticals or themselves have pharmaceutical properties. The pharmaceutical compounds have a serotonininhibiting action so that they may be used in the treatment of psychic and rheumatic illnesses as well as of allergies, inflammations and migraine. 1-cyanoethyl-D-lysergic acid (+)-butanolamide-(2′) has been found to have an especially strong serotonininhibiting action. An effective amount of a compound I is combined with an inert carrier or vehicle to provide a pharmaceutical composition in unit dosage form.

The term "known" as used herein designates a method described in the literature on the subject or in actual use.

In the following non-limitative examples all temperatures are stated in degrees centigrade. The melting points are corrected.

EXAMPLE 1

*1-cyanoethyl-9,10-dihydro-D-lysergic acid methylester*

A solution of 1 g. of 9,10-dihydro-D-lysergic acid methylester in 10 cc. of dioxane is left to stand with 10 cc. of acrylonitrile and 0.05 g. of benzyl-trimethyl-ammonium hydroxide at room temperature for 2 hours. The mixture becomes slightly warm of its own accord and is coloured yellow. The mixture is then shaken between ether and a 1% aqueous tartaric acid solution and the bases, which have been liberated from the aqueous phase by the addition of sodium bicarbonate, are taken up in chloroform. Crystallization from benzene of the crude product remaining after the evaporation of the chloroform yields colourless needles having a melting point of 134–135°. $[\alpha]_D^{20} = -94°$ (c.=0.5 in pyridine). Keller's colour reaction: clear blue, weaker than that of the starting material. Van Urk's colour reaction: pink.

EXAMPLE 2

*1-cyanoethyl-D-lysergic acid diethylamide*

A solution of 1 g. of D-lysergic acid diethylamide in 10 cc. of dioxane is left to stand with 10 cc. of acrylonitrile and 0.05 g. of benzyl-trimethyl-ammonium hydroxide for 2 hours at 20°. The mixture becomes very slightly heated of its own accord and turns yellow. The mixture is then shaken between ether and a 1% aqueous tartaric acid and the bases, which have been liberated from the aqueous phase by the addition of sodium bicarbonate, are taken up in chloroform. The crude product, obtained by evaporating the solvent, is chromatographed on a column of 50 g. of aluminium oxide. The 1-cyanoethyl-D-lysergic acid diethylamide is washed into the filtrate with benzene containing 0.1% of ethanol. $[\alpha]_D^{20} = +14°$ (c.=0.5 in pyridine). Keller's colour reaction: clear blue. Van Urk's colour reaction: weak grey.

Bioxalate: microcrystalline needles of melting point 199–200° from acetone. $[\alpha]_D^{20} = +16°$ (c.=0.4 in water).

EXAMPLE 3

*1-cyanoethyl-9,10-dihydro-ergocornine*

1.7 g. of 9,10-dihydro-ergocornine are heated to the boil at reflux with 10 cc. of acrylonitrile and 0.2 g. of benzyl-trimethyl-ammonium hydroxide for 2 hours. The mixture is then shaken between a 1% aqueous tartaric acid and ether and the crude bases, which have been isolated in the usual manner, are chromatographed on a column of 55 g. of aluminium oxide. The 1-cyanoethyl-9,10-dihydro-ergocornine is washed into the filtrate with absolute chloroform and crystallizes from ethyl acetate in the shape of leaflets containing ethyl acetate and having a melting point of 177–179°. $[\alpha]_D^{20} = -26°$ (c.=0.5 in pyridine). Keller's colour reaction: weak pure blue. Van Urk's colour reaction: very weak grey-pink.

EXAMPLE 4

*1-cyanoethyl-D-lysergic acid (+)-butanolamide-(2')*

A solution of 5 g. of D-lysergic acid (+)-butanolamide-(2') in 150 cc. of acrylonitrile is boiled for 3½ hours together with 0.5 g. of crystalline sodium methylate. The mixture is filtered, evaporated in a vacuum until it has the consistency of syrup, the residue is taken up in 200 cc. of chloroform, filtered again and the filtrate evaporated to dryness and the residue chromatographed on 240 g. of aluminium oxide. Chloroform containing 0.1% of alcohol is used to wash first of all the by-product and then the 1-cyanoethyl-D-lysergic acid (+)-butanolamide-(2') into the filtrate. Prisms having a melting point of 135–137° result from ethyl acetate. $[\alpha]_D^{20} = -47°$ (c.=0.5 in pyridine).

Bimaleate: From methanol/ether needles having a melting point of 199–201°. $[\alpha]_D^{20} = +10°$ (c.=0.2 in water).

EXAMPLE 5

*1-cyanoethyl-9,10-dihydro-D-lysergic acid (+)-butanolamide-(2')*

A solution of 5 g. of 9,10-dihydro-D-lysergic acid (+)-butanolamide-(2') and 1 g. of crystalline sodium methylate in 150 cc. of acrylonitrile is boiled for 1 hour. The mixture is filtered, evaporated to a syrup consistency in a vacuum, the residue taken up in 200 cc. of chloroform, filtered once more, the filtrate evaporated to dryness and the residue chromatographed on 200 g. of aluminium oxide. The by-products are washed into the filtrate with chloroform containing 1% of alcohol and thereafter the 1-cyanoethyl-9,10-dihydro-D-lysergic acid (+)-butanolamide-(2') is washed into the filtrate with the same solvent containing 1–2% of alcohol. From methanol/ether colourless needles having a melting point of 249–251°. $[\alpha]_D^{20} = -125°$ (c.=0.5 in pyridine).

EXAMPLE 6

*1-cyanoethyl-lysergol*

5 g. of lysergol and 1.5 g. of crystalline sodium ethylate are boiled together with 300 cc. of acrylonitrile for 2½ hours at reflux. The mixture is filtered, evaporated to dryness in a vacuum and the residue taken up in 200 g. of aluminium oxide. The by-products are first washed into the filtrate with chloroform containing 0.5% of alcohol and then the 1-cyanoethyl-lysergol is washed into the filtrate with chloroform containing 1% of alcohol. 1-cyanoethyl-lysergol crystallizes from ethyl acetate in the shape of prisms having a melting point of 148–149°. $[\alpha]_D^{20} = +29°$ (c.=0.5 in pyridine).

Bimaleate: from methanol/ether needles having a melting point of 185–186°. $[\alpha]_D^{20} = +90°$ (c.=0.5 in water).

EXAMPLE 7

*1-cyanoethyl-6-methyl-ergolenyl-(8)-carbamic acid diethylamide*

0.1 g. of crystalline sodium ethylate is added to a solution of 1.6 g. of 6-methyl-ergolenyl-(8)-carbamic acid diethylamide in 50 cc. of acrylonitrile, the solution stirred for 10 minutes at 50° and then heated at reflux for 1 hour. After distilling off the major portion of acrylonitrile the mixture is shaken between chloroform and a 1% tartaric acid solution and the basic reaction products, which have been isolated in the usual manner, are chromatographed on 100 g. of aluminium oxide. The cyanoethyl compound is washed into the filtrate with chloroform containing 0.1% of alcohol. The desired cyanoethyl compound crystallizes from ethyl acetate in the shape of prisms having a melting point of 198–200°.

Bimaleate: Needles from methanol. Melting point 175–176°. $[\alpha]_D^{20} = +48°$ (c.=0.5 in water). Keller's colour reaction: blue. Van Urk's colour reaction: very weak salmon colour.

EXAMPLE 8

*1-cyanoethyl-6-methyl-isoergolenyl-(8)-carbamic acid ethylester*

A solution of 1.9 g. of 6-methyl-isoergolenyl-(8)-carbamic acid ethylester in 50 cc. of acrylonitrile is stirred together with 110 mg. of crystalline sodium ethylate for 15 minutes at room temperature, then for half an hour at 50°, a further 50 mg. of sodium ethylate are added and the mixture heated to 50° for 45 minutes. After distilling off the major portion of acrylonitrile the mixture is shaken between chloroform and a 1% tartaric acid solution whereupon the basic reaction product, which has been isolated in the usual manner, is crystallized from methanol. Prisms having a melting point of 129–141° result. $[\alpha]_D^{20} = +280°$ (c.=0.5 in pyridine). Keller's colour reaction: blue. Van Urk's colour reaction: very weak salmon colour.

What is claimed is:
1. A compound selected from the group consisting of compounds of the formula:

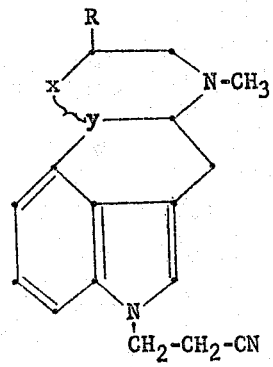

wherein R is a member selected from the group consisting of alkoxycarbonyl, dialkylcarbamoyl and hydroxyalkylcarbamoyl, whereof the alkyl portion in each radical contains from one to four carbon atoms inclusive, and $\overrightarrow{x\,y}$ is one of the radicals

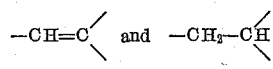

and their pharmaceutically acceptable, non-toxic acid addition salts.

2. 1-cyanoethyl-9,10-dihydro - D - lysergic acid methylester.
3. 1-cyanoethyl-D-lysergic acid diethylamide.
4. 1-cyanoethyl - D - lysergic acid (+)-butanolamide-(2′).
5. 1 - cyanoethyl - 9,10 - dihydro - D - lysergic acid (+)-butanolamide-(2′).

References Cited by the Examiner
UNITED STATES PATENTS

| | | | |
|---|---|---|---|
| 2,994,640 | 8/61 | Zellner | 167—65 |
| 3,047,464 | 7/62 | Schaeppi | 167—65 |
| 3,084,164 | 4/63 | Frey | 260—285.5 |
| 3,113,133 | 12/63 | Hofmann et al. | 260—285.5 |

OTHER REFERENCES

Troxler et al.: Helv. Chim. Acta, vol. 40, pp. 1706–32 (1957).

IRVING MARCUS, *Primary Examiner.*
JOHN D. RANDOLPH, WALTER A. MODANCE, *Examiners.*